April 21, 1931.　　R. M. CRITCHFIELD　　1,801,589

ELECTRIC SWITCH

Filed June 7, 1927

Inventor
Robert M. Critchfield
By Spencer Hardman & Fehr
his Attorneys

Patented Apr. 21, 1931

1,801,589

UNITED STATES PATENT OFFICE

ROBERT M. CRITCHFIELD, OF ANDERSON, INDIANA, ASSIGNOR TO DELCO-REMY CORPORATION, OF DAYTON, OHIO, A CORPORATION OF DELAWARE

ELECTRIC SWITCH

Application filed June 7, 1927. Serial No. 197,183.

This invention relates to electrical switches and particularly to switches adapted to be mounted upon the steering column of an automobile steering gear and to control the circuit of an electric horn or other sound signal.

One of the objects of the present invention is to provide a switch particularly adapted for mounting upon a steering column of a vehicle and having a single operating member which is urged by a spring into normal or circuit open position but which may be moved in either of two directions into two different circuit controlling positions for the purpose of controlling the operation of the sound signal or horn to produce tones varying in pitch as desired.

Further objects and advantages of the present invention will be apparent from the following description, reference being had to the accompanying drawings, wherein a preferred form of embodiment of the present invention is clearly shown.

Figure 1:
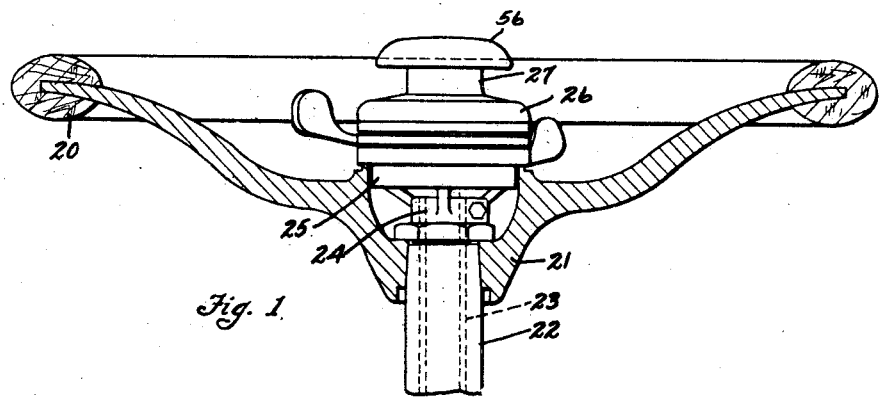
Fig. 1 is a fragmentary view of a steering column control assembly, the steering wheel being shown in section and the horn switch being shown in side elevation above the center of the steering column.

In the drawings, 20 designates a steering wheel attached to its hub 21 to a hollow steering post 22 through which a stationary tube 23 extends. The upper end of the tube is attached by clamp bracket 24 to a flange 25 which supports a circular cap 26 having an upwardly extending annular flange 27 providing a recess 28, for receiving a switch which will now be described.

Figure 2:
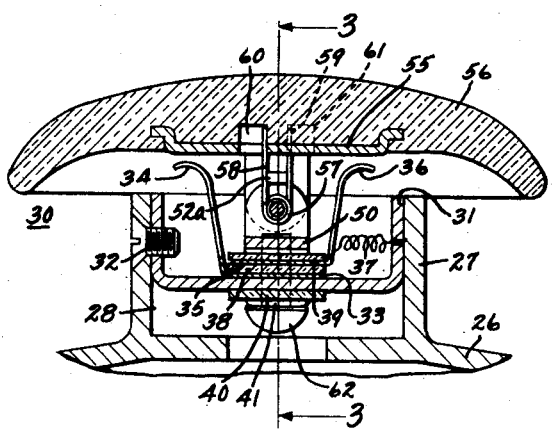
Fig. 2 is a fragmentary vertical sectional view of a switch on a larger scale than shown in Fig. 1.
Figure 3:
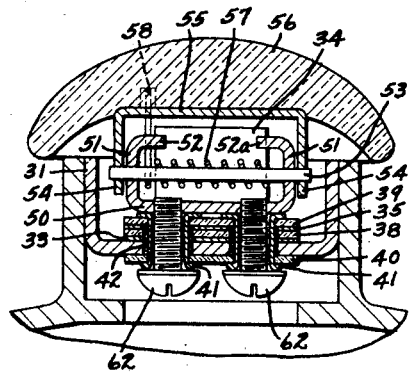
Fig. 3 is a sectional view on the line 3—3 of Fig. 2.

The switch which may be designated in its entirety by numeral 30 comprises a cup-shaped metallic base 31 which is adapted to be attached by a screw 32 to the flange 27. The base 31 is directly electrically connected with a conducting plate 33 having a flexible switch blade member 34 extending therefrom as shown in Figs. 2 and 3; and insulatingly supports a metal plate 35 from which extends a leaf spring conductor 36. The conductor 36 is connected electrically with the switch base 31 by a resistance wire 37. The plates 33 and 35 are separated by a non-conducting plate 38. A non-conducting plate 39 is located upon the plate 35 and a non-conducting plate 40 lines the under surface of the bottom wall of the switch base 31. These conducting and non-conducting plates are held in fixed relation by tubular rivets 41 which extend through aligned apertures in these plates and the bottom wall of the switch base 31 and also through non-conducting tubes 42. In this way the metal rivets 41 are insulated from the plates 33 and 35 and the bottom wall of the switch case. This assembly of parts forms a switch sub-assembly which is included in the combination as a whole.

The other sub-assembly of switch parts comprises a metal plate 50 having upright apertured ears 51 each terminating in a lug 52. The apertured ears 51 support a rod 53 which in turn supports apertured ears 54 extending from a plate 55 which is anchored within a body of insulating material comprising a switch operating member or handle 56. A helical coil spring 57 surrounds the rod 53 and its end 58 bears against the left hand side of the lug 52 as viewed in the direction of arrow 3 in Fig. 2. The other end 59 of the spring 57 bears against the right hand side of the lug 52a as viewed in Fig. 2. These spring ends 58 and 59 are received by recesses 60 and 61 respectively provided in the switch handle 56. The ends 58 and 59 of the spring are biased so as to tend to move in clockwise and counterclockwise directions respectively as viewed in Fig. 2. In other words, the spring end 58 is biased to move in a clockwise direction as viewed in Fig. 2 and the spring end 59 is biased to move in a counterclockwise direction against the lug 52a. Therefore the handle 56 may be moved in either direction relative to the plate 50, against the action of the spring 57, and the spring 57 will return the switch handle 56 in such position that normally the plate 55 will be substantially parallel to the plate 50.

Figure 4:
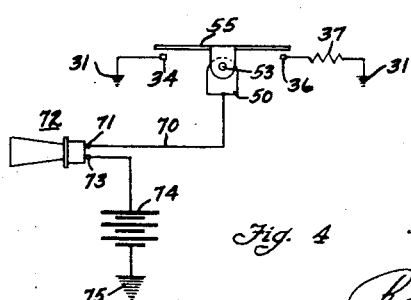
Fig. 4 is a wiring diagram illustrating the use of the switch shown in Figs. 2 and 3.

The assembly of elements which has just been described constitutes the second sub-assembly of elements of the switch and this sub-assembly is attached to the first sub-assembly of elements carried by the switch base 31 by means of screws 62 which pass through the hollow rivets 41 and are threadedly engaged with the plate 50. One of the screws 62 may be used for attaching a wire 70 which may lead from the plate 50 through the stationary tube 23 to one terminal 71 of an electric horn 72 as indicated by Fig. 4. The other terminal 73 is connected with a storage battery 74 which is grounded at 75 as shown in Fig. 4.

To operate the horn 72 at high voltage and hence at relatively higher pitch the handle 56 is pressed so as to move in a counterclockwise direction as viewed in Fig. 2. This action will cause the plate 55 to engage the contact 34 and the following circuit will be established: battery 74, horn terminal 73, terminal 71, wire 70, plate 50, rod 53, plate 55, contact 34, and to ground through the switch base 31 and steering column assembly represented by numeral 31 in the wiring diagram. Movement of the switch handle in this position is opposed by the spring 57 since the spring end 58 is biased to move in a clockwise direction as viewed in Fig. 2 while the spring end 59 bears against the lug 52a and is biased to move in a counterclockwise direction. When the handle 56 is released it will be returned to normal position automatically by the spring 57 and the circuit to the electric horn will be interrupted. If it is desired to produce a warning signal of lower pitch, the switch handle 56 is pressed in a clockwise direction as viewed in Fig. 2 to cause the plate 55 to engage the contact 36 whereupon the horn circuit will be established through a resistance element 37 as clearly shown in Fig. 4. The maintaining of the switch handle 56 in this circuit controlling position is resisted by the spring 57 since the spring end 59 will bear against the side wall of the recess 61 in a counterclockwise direction, while the spring end 58 is placed in a clockwise direction against the lug 52. Hence when the switch handle 56 is released it will move automatically from the second mentioned circuit controlling position to normal position as shown in Fig. 2.

While the form of embodiment of the present invention as herein disclosed, constitutes a preferred form, it is to be understood that other forms might be adopted, all coming within the scope of the claims which follow.

What is claimed is as follows:

1. An electric switch comprising a pair of spaced contacts, a rod located between the contacts, a helical coil spring surrounding the rod and having its ends extending from the rod, lugs respectively engaged by the ends of the spring, the spring ends being biased for rotary movement in opposite directions about the rod and into engagement with the lugs, and a conducting plate hinged upon the rod and movable into engagement with the contacts and having means for receiving the spring ends so that the spring may resist movement of the plate in either direction.

2. An electric switch comprising a cup-shaped base, a hinge bracket secured to said base but insulated therefrom, a hinged contact plate pivotally supported by said bracket and electrically connected therewith, a relatively stationary contact supported by the base but insulated therefrom, and a switch handle attached to the plate and providing a cover for the base and overlying the annular edge thereof to protect the interior of the base and means operable to close any one of a plurality of circuits through said hinge plate, and means normally reestablishing said plate in open circuit relation after connection with any one of said contacts.

3. A switch for controlling electric horns and comprising a metal base providing a ground terminal, leaf spring conductors extending from the base in diverging relation, one of the conductors being in direct electrical contact with the base and the other insulated therefrom, a tubular metal rivet for securing the conductors to the base, the rivet being insulated from the conductors and the base, a metal hinge plate attached to the rivet by a screw passing through it and serving as a terminal for the plate, and a metal conducting plate pivotally supported by the hinge plate and electrically connected therewith and movable about its hinge into engagement with either of the conductors.

4. A switch for controlling electric horns and comprising a metal base providing a ground terminal, leaf spring conductors extending from the base in diverging relation, one of the conductors being in direct electrical contact with the base and the other insulated therefrom, a hinge plate insulatingly supported on said base and providing inwardly and oppositely extending stop lugs, an oscillatable controller pivoted to said hinge plate and providing a contact member engageable with either of said leaf spring conductors, and means normally engaging each of said stop lugs biasing said controller to a neutral position out of contact with either of said leaf spring conductors.

5. An electric switch comprising a pair of spaced contacts, a rod located between the contacts, a helical coil spring surrounding the rod and having its ends extending from the rod, lugs respectively engaged by the ends of the spring, the spring ends being biased for rotary movement in opposite directions about the rod and into engagement with the lugs, and a bridging contact oscillatable about said rod and optionally engageable with either of said contacts, said spring disposing said bridging contact in a neutral position free from engagement with either of said contacts.

6. An electric switch comprising a pair of spaced contacts, a rod located between the contacts, a helical coil spring surrounding the rod and having its ends extending from the rod, lugs respectively engaged by the ends of the spring, the spring ends being biased for rotary movement in opposite directions about the rod and into engagement with the lugs, and a conducting plate hinged upon the rod and movable into engagement with the contacts and having means for receiving the spring ends whereby the conducting plate will normally be maintained in non-electrical relation with said spaced contacts, but selectively engageable therewith.

7. A switch for controlling electric horns and comprising a metal base providing a ground terminal, a pair of spaced contacts, a rod located between the contacts, a helical coil spring surrounding the rod and having its ends extending from the rod, lugs supported by said base and carrying said rod, the ends of said spring engaging the lugs and being biased for rotary movement in opposite directions about the rod and into engagement with the lugs, and a conducting plate hinged upon the rod and movable into engagement with the contacts and having means for receiving the spring ends so that the spring may resist movement of the plate in either direction.

In testimony whereof I hereto affix my signature.

ROBERT M. CRITCHFIELD.